Dec. 5, 1961         J. HANISKO         3,011,780
                    UNIVERSAL GAUGE
Filed Jan. 2, 1958                      3 Sheets-Sheet 1
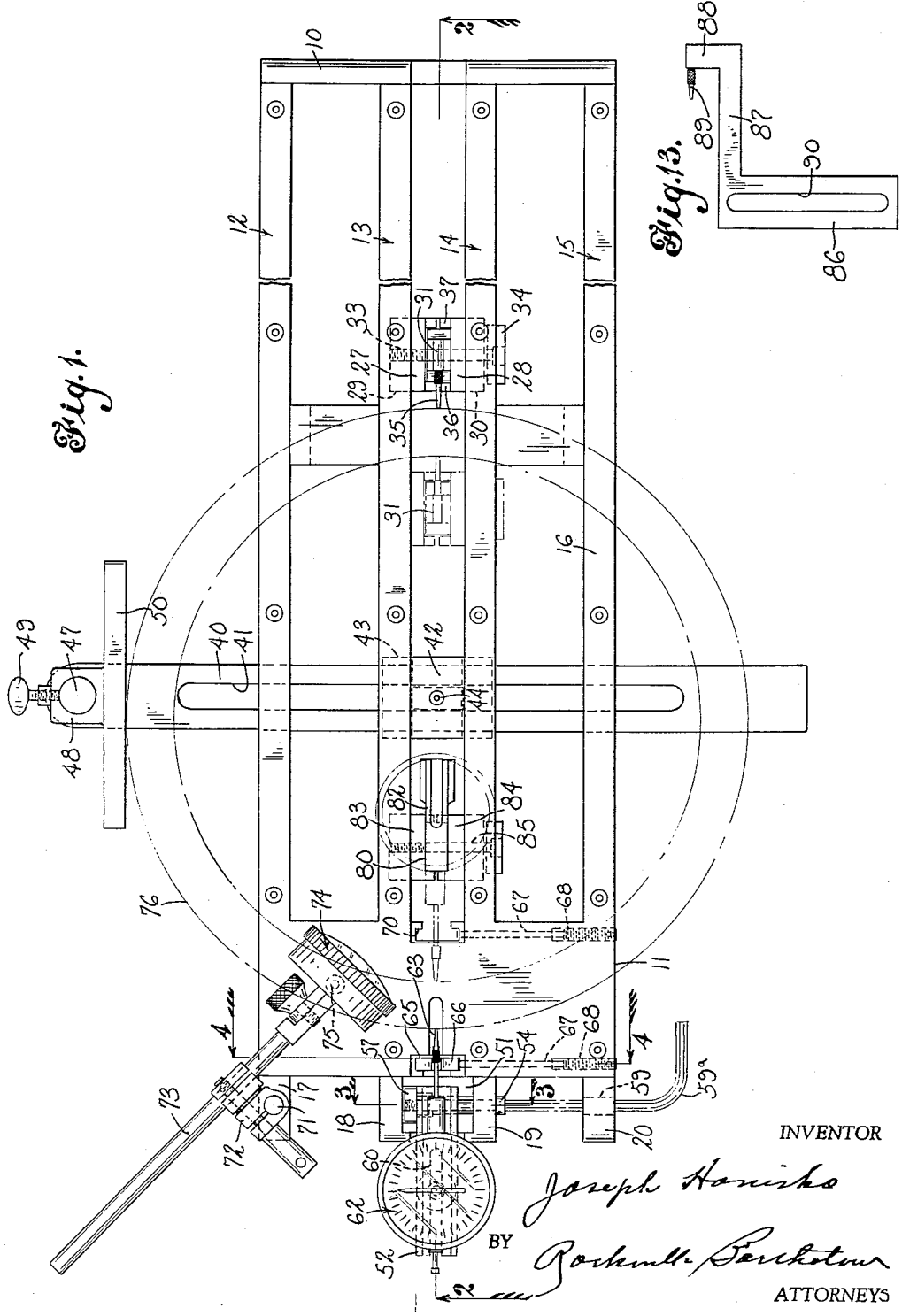
INVENTOR
Joseph Hanisko
BY
ATTORNEYS

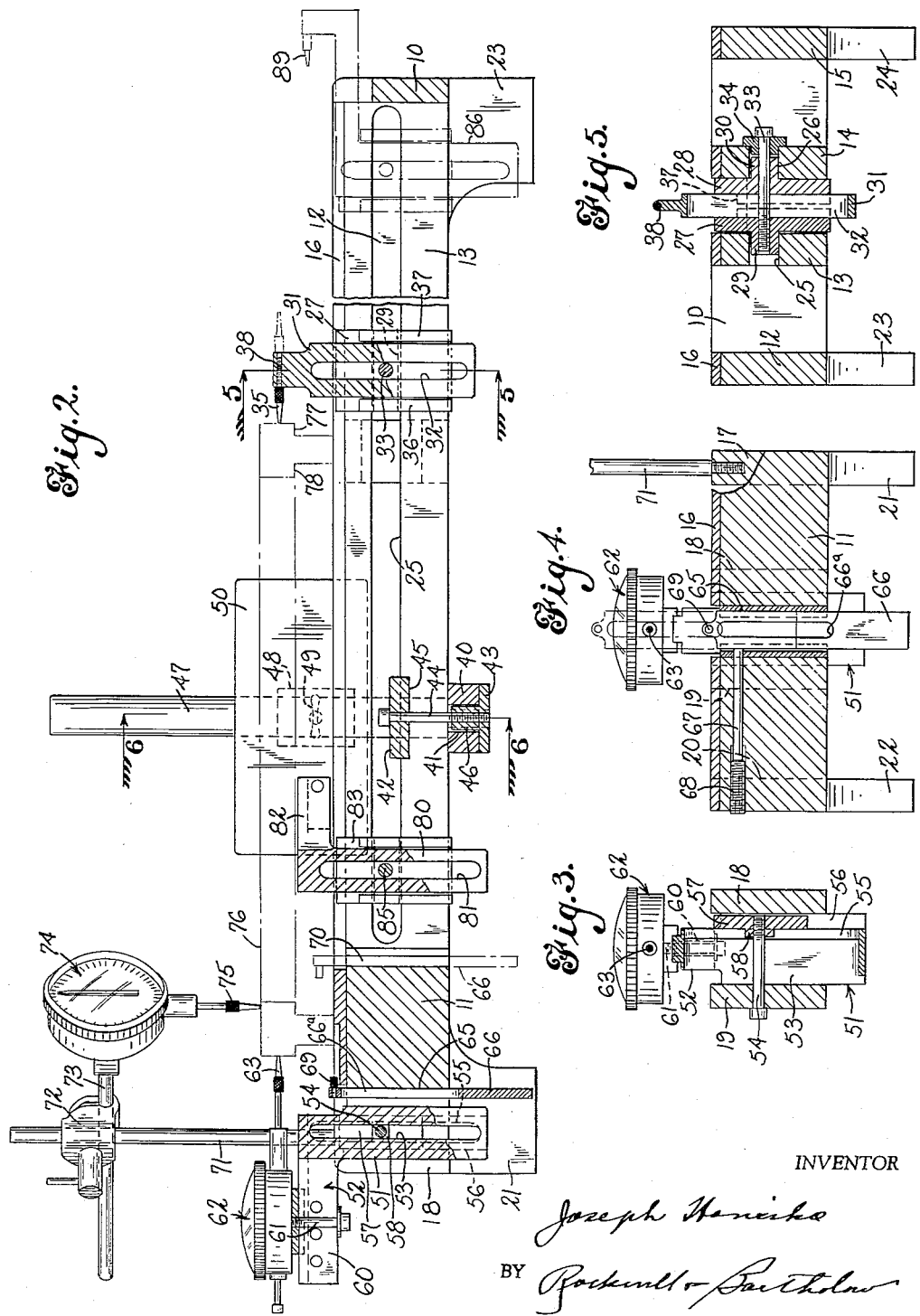

Dec. 5, 1961 J. HANISKO 3,011,780
UNIVERSAL GAUGE
Filed Jan. 2, 1958 3 Sheets-Sheet 3
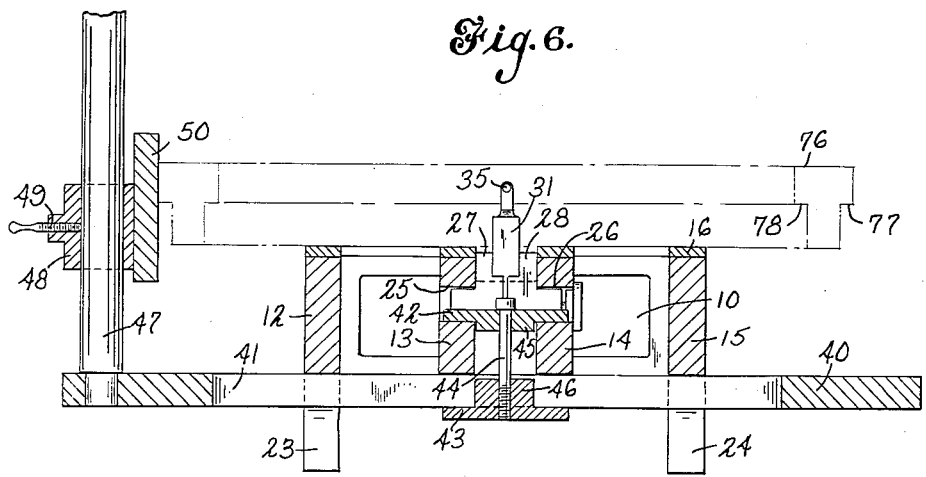
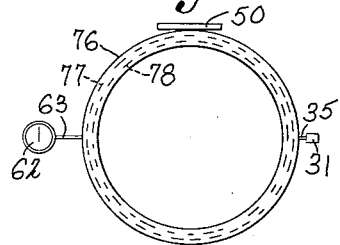
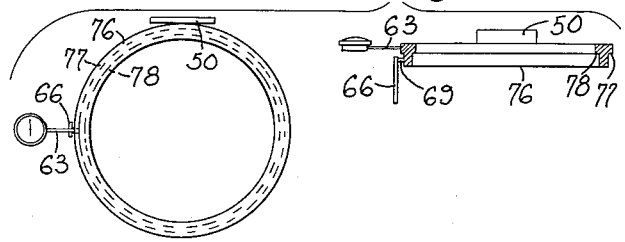
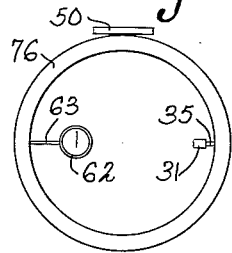
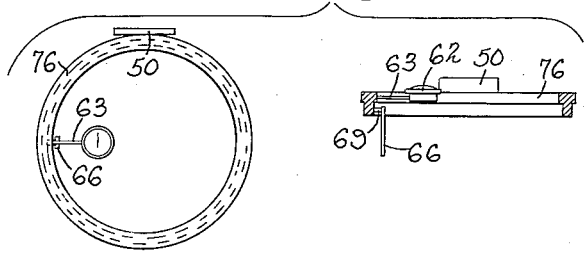
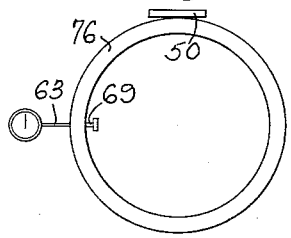
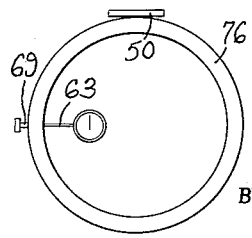
INVENTOR
Joseph Hanisko
BY Rockwell & Bartholow
ATTORNEYS United States Patent Office 3,011,780
Patented Dec. 5, 1961

3,011,780
UNIVERSAL GAUGE
Joseph Hanisko, Sullivan Road, Yalesville, Conn.
Filed Jan. 2, 1958, Ser. No. 706,649
5 Claims. (Cl. 269—166)

This invention relates to gauge mechanisms and more particularly to a gauging device which will be practically universal in scope in that it may be employed for gauging a great many different dimensions and in many instances a comparison may be made between dimensions.

It has been more or less the custom in the past to employ a different gauge for each different use to which a gauge is to be put. For example, one gauge is employed to measure the height of an object, another the thickness thereof, another the interior or exterior diameter of a tubular or cylindrical object, and so forth. In some instances wherein a number of measurements must be made of a particular workpiece it has sometimes been the custom to make a special gauge for this particular job, which gauge is discarded or no longer employed after the job is finished. There has, therefore, been a demand for a gauge which will be substantially universal in character and which may serve to measure different shapes or sizes of objects and for various kinds of measurements such as inside or outside diameter concentricity of inner and outer surfaces of annular members, width, and height, thickness and so forth.

It is contemplated by the present invention to provide a gauge apparatus of such character that it may satisfy this demand and which may be employed to make many different measurements on objects of varied size and shape. As illustrated, the device comprises a base or table-like structure having end members connected by spaced longitudinal elements and mounted on this base member, and in some instances movably mounted between the longitudinal elements referred to, are gauge or anvil-supporting members which are adjustable so that many different measurements may be made. Also mounted on the frame for adjustment in a direction generally transverse to the longitudinal elements is a stop member which is also adjustable in a vertical direction so that it may be engaged with the work and properly center the same.

One object of the present invention is to provide a new and improved gauge mechanism which will be universal in use.

Another object of the invention is to provide an improved gauge mechanism capable of gauging many dimensions of objects of various shapes whether such objects may be hollow, annular or solid, and regardless of the size of the objects within the limits of the dimensions of the apparatus.

Still another object of the invention is to provide a gauge mechanism comprising a base upon which gauges and cooperating anvil or finger members may be mounted in various positions and in various relations whereby the dimensions of objects of many different sizes and shapes may be accurately determined.

To these and other ends the invention consists in the novel features and combinations of parts to be hereinafter described and claimed.

In the accompanying drawings:

FIG. 1 is a top plan view of a gauging apparatus embodying my invention;

FIG. 2 is a longitudinal sectional view on line 2—2 of FIG. 1;

FIG. 3 is a detail sectional view on line 3—3 of FIG. 1;

FIG. 4 is a transverse sectional view on line 4—4 of FIG. 1;

FIG. 5 is a transverse sectional view on line 5—5 of FIG. 2;

FIG. 6 is a transverse sectional view on line 6—6 of FIG. 2;

FIGS. 7 to 12 inclusive represent diagrammatically the positions of the gauge and cooperating anvil or finger mechanisms for measuring various dimensions of an annular or ring-shaped object having a step or shoulder thereon; and FIG. 13 is an elevational view of an adapter member employed with the gauge apparatus.

To illustrate a preferred embodiment of my invention I have shown in the drawings a bed or frame comprising end members 10 and 11 connected by spaced longitudinal elements 12, 13, 14 and 15. These elements may be integrally formed, if desired, and the longitudinal elements together present a top or table portion upon which objects of considerable size may be placed. If desired, the upper surface of the frame may be covered with a plate 16 of hardened material so as to prevent wear and, if wear or other injury occurs, may be readily replaced without having to supply a complete new frame. This plate has spaced longitudinal elements of the same width as those of the frame, as shown in FIG. 5, so as to overlie the elements 12, 13, 14 and 15.

The end member 11 is of considerable width as shown so that smaller objects may be supported thereon, and projecting forwardly from this frame are flanges 17, 18, 19 and 20, the flanges 17 and 20 being continued downwardly to form the feet 21 and 22, while at the other end of the frame it is supported upon feet 23 and 24 extending downwardly from the elements 12 and 15.

The intermediate elements 13 and 14 are spaced apart so that supporting devices may be mounted between them so as to be adjustable longitudinally of the frame. As shown in FIGS. 2 and 5, these members are longitudinally slotted as at 25 and 26. As shown in FIG. 5, clamp plates 27 and 28 are disposed between the elements 13 and 14, these clamp plates being provided with bosses 29 and 30 which are slidably received in the slots 25 and 26 so that the plates may be moved longitudinally of the frame. These plates may be clamped together upon an adapter 31 provided with a vertical slot 32 to receive a screw 33 threaded into the boss 29 passed through a shouldered cap 34 which bears against the member 14. The head of the screw in turn bears against the head of this cap.

The adapter 31 forms an adjustable support for the anvil or finger 35 threadedly engaged therewith (FIGS. 1 and 2), which is adapted to engage the work as will be hereinafter explained. It will be seen that the member 31 may be adjusted in a vertical direction by loosening the screw 33 and also may be adjusted in a horizontal direction in the slot 25. Upon tightening the screw 33 the member 31 will be held in place by being clamped between the plates 27 and 28 so that it cannot move vertically and the plate 28 will be clamped against the longitudinal element 14 by means of the screw head engaging the cap 34. The plates 27 and 28 may be provided with flanges 36 and 37 to maintain the adapter 31 in upright position.

The finger 35 is threaded into the member 31, as shown at 38, so that it may be removed and pointed in the opposite direction if desired or removed for replacement.

Extending below the frame is a slotted bar 40 having a longitudinal slot 41 therein. This bar engages the lower surface of the frame members 12, 13, 14 and 15 and may be clamped thereagainst by means of the clamping plates 42 and 43 (FIG. 6) which are held together by the screw 44. The clamping plate 42 is provided with a boss 45 disposed between the members 13 and 14 while the plate 43 is provided with a boss 46 slidably received in the slot 41 of the member 40. With this arrangement it will be seen that upon loosening the screw 44 the bar 40 may be adjusted longitudinally of the frame to the desired position as permitted by the length of the slots 25 within which the plate 42 lies. Also the bar 40 may be adjusted transversely of the frame or in the direction of the length of the bar, this adjustment being limited by the length of the slot 41.

Secured to one end of the bar 40 is a post 47 upon which is slidably mounted a collar 48 held in adjusted position by a screw 49. Secured to the collar 48 is a stop member 50 adapted to engage one end of the workpiece which is to be measured, this workpiece being mounted upon the upper surface of the frame.

Adapted to be clamped between the flanges 18 and 19 is an L-shaped adapter consisting of a vertical arm 51 and a horizontal arm 52 (FIGS. 1, 2, and 3). The vertical arm 51 of this member is provided with a slot 53 adapted to receive a screw 54 and is also provided with countersunk recesses 55 and 56. The latter is adapted to receive the body of a clamping plate 57 while the countersunk recess 55 slidably receives a boss 58 secured to the plate 57. With this construction tightening of the screw 54 will secure this L-shaped adapter in place but, when the screw is loosened, it may be adjusted in a vertical direction as determined by the length of the slot 53. The flange 20 may be provided with an opening 59 through which a wrench 59ª shown in dotted lines in FIG. 1 may be inserted to adjust the screw 54.

The horizontal arm 52 of this member is slotted, as shown at 60, to receive a screw 61 which adjustably secures a gauge indicator 62 to the arm 52. Upon loosening of the screw the gauge member 62 may be adjusted along the arm 52 in a direction longitudinally of the frame. This gauge is provided with the usual movable stem 63 to engage the surface of the object to be measured.

The end portion 11 of the table may be provided with a slot or recess 65 (FIGS. 1 and 4) at its end face to slidably receive a plate 66 (FIGS. 2 and 4), which plate may be held in place by a screw 67 threaded at 68 into the side face of the end portion 11. By loosening this screw the plate 66 may be adjusted in a vertical direction. Secured to this plate is a stop member 69 with which the work is adapted to be engaged when certain measurements are to be made. A similar recess 70 may be provided at the opposite face of the end portion 11 in which the member 66 may be placed, if desired as shown in dotted lines in FIG. 2, so that the stop 69 may be engaged with the opposite side of the workpiece or upon an inner surface if the workpiece is one of annular shape. The plate 66 is provided with a slot 66ª so that, if adjusted vertically to its limit, the stem 63 may pass through this slot.

Threaded through the upper surface of the flange 17, as shown in FIGS. 1, 2 and 4, is a post 71 to which a clamp 72 is adjustably secured for vertical adjustment thereon. Secured in this clamp for horizontal adjustment is a rod 73 which carries an indicator gauge 74 having the usual adjustable stem 75 extending downwardly in a vertical direction.

A workpiece of annular or ring shape is shown upon the base or frame in dotted lines, as indicated at 76. As illustrated, it is provided with an outer shoulder 77 and an inner shoulder 78, thus providing this member with two outside diameters and two inside diameters as is sometimes the case. As shown in dotted lines in FIG. 2 and as has already been described, the plate 66 may be moved from the recess 65 to the recess 70. In the former case the stop 69 may engage the outer surface of the workpiece while in the latter case it may engage the inner surface. It may also be desirable to mount the indicator gauge 62 so that its stem 63 may engage the inner diameter of the workpiece. To this end an L-shaped adapter member is provided for sliding engagement between the longitudinal members 13 and 14.

This member is provided with a vertical portion 80 (FIG. 2) having a slot 81 therein and a horizontal portion 82 which is bifurcated or forked, as shown in FIG. 1. This member is designed to be held in place by clamp blocks 83 and 84 with which is engaged a holding screw 85 similar to the corresponding elements 27 and 28 and screw 33 associated with the adapter 31. This adapter member may be adjusted vertically and also horizontally between the elements 13 and 14 and the gauge indicator 62 may be secured to the bifurcated arms 82 by the screw 61, as shown in connection with the arm 60. Thus the gauge indicator 62 may be mounted within a workpiece so that the stem 63 may engage the interior diameter thereof which is desirable when gauging the concentricity between two internal diameters or gauging the internal diameter of the member itself.

In order to handle larger or longer workpieces without making the bed or frame of the device so large as to be unwieldy, I have provided an L-shaped adapter member which may be employed in place of the member 31, as shown in dotted lines in FIG. 2. This member comprises a vertical arm 86 and a horizontal arm 87 having an upstanding end portion 88 to which is threadedly secured a finger 89 (FIG. 13) similar to the finger 35. This member is slotted, as shown at 90, and secured to the frame in the same manner as the member 31 so that it may be adjusted both vertically and horizontally. When mounted adjacent the end of the frame, as shown in FIG. 2, the arm 87 projects beyond the frame and increases the effective length thereof.

It will be seen that with the construction described many different measurements may be made by the present gauge device together with the attachments therefor. As shown in FIG. 2, for example, the annular workpiece 76 may be mounted upon the upper surface of the frame or bed and the finger 35 engaged with the outer periphery at one side while the stem 63 will be engaged with the periphery at the other side. Either the indicating gauge 62 or the adapter 31 may be moved longitudinally of the bed in order to accommodate the size of the workpiece. If the workpiece is an annular member, as shown, it will be necessary to set the stop 50 when the members 63 and 35 are positioned on a diameter of the workpiece. To effect this result the workpiece may be moved between these two elements until the greatest dimension is reached. With the workpiece in this position the bar 40 may be moved inwardly until the stop 50 engages the periphery of the work. The indicator gauge 62 may then be set at zero. The workpiece may then be rotated in engagement with the stop 50 and the O. D. of the workpiece may be measured.

If it is desired to measure the height of the workpiece or the thickness thereof, the indicator gauge 74 may be set with its stem 75 against the work and, by rotation of the latter, this measurement may be taken. The above outside diameter measurement is the position in which the parts are shown in FIGS. 1, 2 and 7. This will, of course, also gauge the out-of-round condition.

If it is desired to measure the internal diameter and also whether or not an out-of-round condition exists, the parts are positioned as shown in FIG. 8 where both the indicator gauge 62 and the adapter 31 are disposed within the workpiece. In this case the finger 35 may be unscrewed from the member 31 and screwed in the opposite side thereof so as to point in the opposite direction.

If the workpiece has two outer diameters and it is desired to measure the concentricity thereof, the parts are adjusted as shown in FIG. 9 wherein the indicator gauge 62 is mounted, as shown in FIG. 2, while the slide member 66 is raised and the parts are positioned so that the stop member 69 may engage the lower portion of the work. If the work is now rotated, the concentricity of the two outside diameters will be determined.

Likewise, as shown in FIG. 10, the concentricity of the two inside dimensions may be determined by moving the member 66 to its dotted-line position, shown in FIG.

2, and also positioning the indicator gauge 62 on the adapter 80 so that the indicator gauge will engage one of the interior dimensions while the stop 69 will engage the other.

If it is desired to determine wall thickness or relation between outside and inside diameters, the parts may be positioned as shown in FIGS. 11 and 12. In FIG. 11 the indicator gauge 62 engages the outside diameter of the workpiece while the finger 35 engages the inside. The opposite relationship is shown in FIG. 12.

While I have shown and described one embodiment of my invention, it will be understood that it is not to be limited to all of the details shown, but is capable of modification and variation within the spirit of the invention and within the scope of the claims.

What I claim is:

1. A gauging apparatus comprising a bed having feet members extending downwardly therefrom to space the bed from a support, said bed comprising end members and two spaced members extending longitudinally of the bed between said end members, leaving an open vertical space between said spaced members, said spaced members having their upper surfaces disposed in coplanar relation to provide a work-supporting surface, said spaced members having opposed vertical faces and longitudinal slots extending through said faces, a supporting element carrying a work-engaging member mounted between said spaced members, a clamping plate on each side of said element, each having a boss slidably engaged in the slot in the adjacent spaced member, and securing means for drawing said clamping plates together and drawing one thereof against the vertical face of the adjacent spaced member to secure said supporting element in adjusted positions along said spaced member.

2. A gauging apparatus comprising a bed having feet members extending downwardly therefrom to space the bed from a support, said bed comprising end members and two spaced members extending longitudinally of the bed between said end members, leaving an open vertical space between said spaced members, said spaced members having their upper surfaces disposed in coplanar relation to provide a work-supporting surface, said spaced members having opposed vertical faces and longitudinal slots extending through said faces, a supporting element carrying a work-engaging member mounted between said spaced members, a clamping plate on each side of said element, each having a boss slidably engaged in the slot in the adjacent spaced member, securing means for drawing said clamping plates together and drawing one thereof against the vertical face of the adjacent spaced member to secure said supporting element in adjusted positions along said spaced member, and said supporting element also being adjustable in a vertical direction with respect to said clamping plates.

3. A gauging apparatus comprising a bed having feet members extending downwardly therefrom to space the bed from a support, said bed comprising end members and two spaced members extending longitudinally of the bed between said end members, leaving an open vertical space between said spaced members, said spaced members having their upper surfaces disposed in coplanar relation to provide a work-supporting surface, said spaced members having opposed vertical faces and longitudinal slots extending through said faces, a supporting element carrying a work-engaging member mounted between said spaced members, a clamping plate on each side of said element, each having a boss slidably engaged in the slot in the adjacent spaced member, securing means for drawing said clamping plates together and drawing one thereof against the vertical face of the adjacent spaced member to secure said supporting element in adjusted positions along said spaced member, said supporting element having a vertical elongated body portion with a slot therein, and said securing means comprising a screw extending through said slot to permit vertical adjustment of said supporting element.

4. A gauging apparatus comprising a bed having feet members extending downwardly therefrom to space the bed from a support, said bed comprising end members and two spaced members extending longitudinally of the bed between said end members, leaving an open vertical space between said spaced members, said spaced members having their upper surfaces disposed in coplanar relation to provide a work-supporting surface, said spaced members having opposed vertical faces and longitudinal slots extending through said faces, a supporting element carrying a work-engaging member mounted between said spaced members, a clamping plate on each side of said element, each having a boss slidably engaged in the slot in the adjacent spaced member, securing means for drawing said clamping plates together and drawing one thereof against the vertical face of the adjacent spaced member to secure said supporting element in adjusted positions along said spaced member, and said supporting element comprising an L-shaped member having a vertically disposed body portion and a horizontally extending arm disposed above the upper surfaces of the spaced members, and said work-engaging member being supported upon said arm.

5. A gauging apparatus comprising a bed having feet members extending downwardly therefrom to space the bed from a support, said bed comprising end members and two spaced members extending longitudinally of the bed between said end members, leaving an open vertical space between said spaced members, said spaced members having their upper surfaces disposed in coplanar relation to provide a work-supporting surface, a supporting element carrying a work-engaging member mounted between said spaced members and adjustably clamped thereto for adjustment in a direction longitudinally thereof, a slotted bar extending transversely of said spaced members and projecting laterally beyond the bed, a work stop carried by the bar at the projecting end of the latter and adjustable relatively thereto in a vertical direction, said spaced members having longitudinally slots extending through the lateral faces thereof, and clamping members, one engaged in the slots of said spaced members and the other engaged in the slot of said transverse bar to adjustably secure the latter to said spaced members.

References Cited in the file of this patent

UNITED STATES PATENTS

| 767,876 | Eichblatt | Aug. 16, 1904 |
| 1,134,106 | Clarke | Apr. 6, 1915 |
| 1,961,663 | Goulder | June 5, 1934 |
| 2,026,784 | Hansen | Jan. 7, 1936 |
| 2,205,799 | McMenamin | June 25, 1940 |
| 2,359,018 | Balk | Sept. 26, 1944 |
| 2,369,425 | Becker | Feb. 13, 1945 |
| 2,501,148 | Weis | Mar. 21, 1950 |
| 2,607,545 | Kaminski | Mar. 2, 1954 |

FOREIGN PATENTS

| 913,752 | France | Sept. 19, 1946 |
| 69,088 | Netherlands | Dec. 15, 1951 |
| 1,090,408 | France | June 28, 1956 |